US012523047B2

(12) United States Patent
De Rick (10) Patent No.: US 12,523,047 B2
(45) Date of Patent: Jan. 13, 2026

(54) FLOOR ELEMENT

(71) Applicant: Unilin BV, Wielsbeke (BE)

(72) Inventor: Jan De Rick, Geraardsbergen (BE)

(73) Assignee: Unilin BV, Wielsbeke (BE)

(*) Notice: Subject to any disclaimer, the term of this patent is extended or adjusted under 35 U.S.C. 154(b) by 124 days.

(21) Appl. No.: 18/266,817

(22) PCT Filed: Dec. 15, 2021

(86) PCT No.: PCT/IB2021/061738
§ 371 (c)(1),
(2) Date: Jun. 13, 2023

(87) PCT Pub. No.: WO2022/144662
PCT Pub. Date: Jul. 7, 2022

(65) Prior Publication Data
US 2024/0052644 A1    Feb. 15, 2024

Related U.S. Application Data

(60) Provisional application No. 63/130,983, filed on Dec. 28, 2020.

(51) Int. Cl.
*E05F 15/00*    (2015.01)
*E04F 15/02*    (2006.01)
*E04F 15/10*    (2006.01)

(52) U.S. Cl.
CPC ...... *E04F 15/107* (2013.01); *E04F 15/02038* (2013.01); *E04F 15/105* (2013.01); *E04F 2201/0123* (2013.01)

(58) Field of Classification Search
CPC . E04F 15/105; E04F 15/02038; E04F 15/107; E04F 15/102; E04F 2201/042;
(Continued)

(56) References Cited

U.S. PATENT DOCUMENTS 7,827,749 B2 * 11/2010 Groeke ................. E04F 13/165
52/592.1
10,006,210 B2    6/2018 Pervan et al.
(Continued)

FOREIGN PATENT DOCUMENTS

JP    6480491 B2    3/2019
WO    9426999 A1    11/1994
(Continued)

OTHER PUBLICATIONS

International Search Report and Written Opinion of the International Searching Authority dated Mar. 3, 2022, regarding International Application No. PCT/IB2021/061738 filed Dec. 15, 2021, 12 pages.
(Continued)

*Primary Examiner* — Chi Q Nguyen
(74) *Attorney, Agent, or Firm* — Ryan D. Jenlink; Conley Rose, P.C.

(57) ABSTRACT

A floor element for forming a floor covering. The floor element has a support layer which is provided with coupling elements on at least a first pair of opposite sides. The coupling elements on the first pair of opposite sides are in the form of a tongue extending along a length of the first edge and a groove extending along a length of the second edge. The tongue is provided with a first locking surface and the groove is provided with a second locking surface, the first and second surfaces being intended to prevent two joined elements from drifting apart in a horizontal direction perpendicular to the joined edge. The first locking surface extends along a portion of portions of the first edge length and/or the second locking surface extends along only a portion of the second edge length.

17 Claims, 2 Drawing Sheets

(58) Field of Classification Search
CPC .......... E04F 2201/0123; E04F 2201/03; E04F 2201/0552; E04F 2201/023; E04F 2201/0535; E04F 2201/0146; E04F 2201/043; E04F 2201/0547; E04F 2201/0153; E04F 2201/0138
See application file for complete search history.

(56) References Cited

U.S. PATENT DOCUMENTS

| | | | | |
|---|---|---|---|---|
| 10,677,275 | B1* | 6/2020 | Caselli | E04F 15/02033 |
| 11,208,814 | B2* | 12/2021 | De Rick | E04F 15/10 |
| 11,565,501 | B2* | 1/2023 | Van Vlassenrode | B32B 5/18 |
| 12,152,626 | B2* | 11/2024 | Caselli | F16B 5/008 |
| 2003/0101681 | A1* | 6/2003 | Tychsen | E04F 15/04 |
| | | | | 52/578 |
| 2015/0121793 | A1* | 5/2015 | Segaert | B32B 5/024 |
| | | | | 52/506.01 |
| 2015/0267418 | A1* | 9/2015 | Vermeulen | E04F 15/02038 |
| | | | | 52/582.2 |
| 2018/0258651 | A1* | 9/2018 | Meersseman | E04B 1/541 |
| 2018/0298621 | A1* | 10/2018 | Courey | B32B 3/06 |
| 2019/0316363 | A1* | 10/2019 | Courey | B32B 5/32 |
| 2022/0018139 | A1* | 1/2022 | Baert | B32B 5/16 |
| 2022/0213693 | A1* | 7/2022 | Courey | B32B 27/32 |

FOREIGN PATENT DOCUMENTS

| | | |
|---|---|---|
| WO | 2004097141 A2 | 11/2004 |
| WO | 2008097860 A2 | 8/2008 |
| WO | 2022144662 A1 | 7/2022 |

OTHER PUBLICATIONS

Priority Document for U.S. Appl. No. 63/130,983, filed Dec. 28, 2020.

* cited by examiner

FLOOR ELEMENT

CROSS REFERENCE TO RELATED APPLICATIONS

This application is a filing under 35 U.S.C. 371 of International Application No. PCT/IB2021/061738, filed Dec. 15, 2021, entitled "Floor Element," which claims priority to U.S. Provisional Patent Application No. 63/130,983, filed Dec. 28, 2020, entitled "Floor Element," which applications are incorporated by reference herein in their entirety.

TECHNICAL FIELD

The present invention relates to a floor element for forming a floor covering, as well as to a floor covering made up of a plurality of floor elements.

BACKGROUND

More particularly, the present invention relates to a floor element for forming a floor covering, wherein the floor element has a decorative layer and a support layer bearing the decorative layer. Typically, such a floor element may be an elongate panel or a square tile. Although not limited thereto, the present invention will be described in the following in relation to a floor element with the decorative layer in the form of a ceramic tile.

Traditionally, ceramic tiles are installed by laying them side by side on a surface such as a floor or wall. Typically, an adhesive compound is used to attach the tiles to the surface. Seams between the tiles are grouted. In this way, the tiles are bonded to a rigid surface, for example a concrete subfloor, thereby improving their impact strength. The bond with the subfloor, and thus also with the structure of the dwelling, also leads to a high attenuation of walking sounds, both in the room where the floor is installed, and in quarters below the respective room. The tiled surface is water impervious and hygienic, since it can be cleaned in a very wet manner. The step of installing the tiles with an adhesive is, however, labor intensive and represents a significant portion of the labor involved in a typical floor covering installation. Moreover, this installing technique requires high professional competence in order to obtain a well-levelled floor covering. Thus, due to the time and labor involved in the installation, it is typically quite costly to have tiles professionally installed.

To substitute an existing floor covering made of tiles, it is often necessary to break the tiles, regenerate the surface by removing residues of the adhesive and then install a new floor covering. Thus, the removal of a floor covering made of tiles is a labor- and time-consuming operation. If the aim of the restoration is to substitute only one or a few damaged tiles, this operation also becomes difficult, since the substitution of one tile may damage adjacent tiles.

In recent years, manufacturers have attempted to produce do-it-yourself tiling solutions that are easier to install. Some examples of these attempts are shown in WO 2004/097141 and WO 2008/097860. The floor elements disclosed in these documents can be laid on a surface and mechanically coupled together to form a floor covering without the use of an adhesive, thereby reducing the labor and time of the installing phase. Such a kind of floor covering is known as a floating floor covering. In particular, in these documents, a ceramic tile or natural stone slab is fixed to a support layer that comprises coupling elements configured to realize a coupling with coupling elements of an adjacent floor element, thereby forming a floor covering. Typically, the coupling elements are in the form of a tongue and a groove along opposite sides of the floor element.

When laying floor elements which are provided with a tongue-and-groove connection along all four sides, a first row of elements is formed by inserting the tongue on a first edge of a new floor element into the groove on a second edge of an already laid floor element of the row to thereby form a row of floor elements which are joined along a first pair of opposite sides. To form a second row, the tongue on a third edge of a new floor element is inserted into the groove on a fourth edge of an already laid floor element in the first row to thereby form a joint along a second pair of opposite sides of the floor elements. A subsequent floor element in the second row then has to be joined to both the adjacent floor element in the second row as well as to the floor elements of the first row. Typically, this is achieved by firstly inserting the tongue on the third edge of the subsequent floor element into the groove formed along the fourth edge of the first row of floor elements to make up the joint between second pairs of opposite sides. The subsequent floor element then has to be slid along the made-up joint to allow the tongue on the first edge of the subsequent floor element to engage with the groove on the second edge of the adjacent floor element of the second row.

Although the above-described laying procedure requires no adhesive and can normally be performed by the average handyman, it can be difficult to effect sliding of one floor element relative to another, particularly if the floor elements are heavy, for example if they comprise a decorative layer made of a ceramic or other hard material and/or if the floor element comprises a heavy support layer, for example a support layer made of mineral-based or cement-based material. A known way of facilitating sliding of two joined floor panels relative to each other is disclosed in WO-A-94/26999. In this document, the provision of a small play between locking surfaces of a tongue-and-groove connection is disclosed. However, the provision of a small play may lead to the formation of gaps between panels and requires close machine tolerancing.

It is therefore an object of the present invention to provide a floor element which may be easily joined to further floor elements to form a floor covering.

BRIEF SUMMARY OF THE INVENTION

In accordance with one independent aspect of the present invention, this object is achieved by means of a floor element for forming a floor covering, the floor element comprising an upper surface, a lower surface opposite the upper surface, a first edge and a second edge forming a first pair of opposite sides, a third edge and a fourth edge forming a second pair of opposite sides. The floor element is provided with coupling elements on at least the first pair of opposite sides. The coupling elements on the first pair of opposite sides are in the form of a tongue extending along a length of said first edge and a groove extending along a length of the second edge. The tongue is provided with a first locking surface and the groove is provided with a second locking surface, the first and second surfaces being intended to prevent two joined elements from drifting apart in a horizontal direction perpendicular to the joined edge. The first locking surface extends along only a portion or portions of the first edge length to thereby provide a first remaining length or lengths devoid of the first locking surface. Separately or in combination, the second locking surface may extend along only a portion or portions of the second edge length to thereby provide a second remaining length or lengths devoid of the second locking surface. The inventors have found that, by providing regions along the coupling elements which are devoid of locking surfaces, resistance to sliding one panel relative to another is reduced without the need to introduce further play into the thus formed joint.

In the preferred embodiment, the floor element comprises a decorative and support layer. Said coupling elements are at least partially formed in the support layer, more preferably they are entirely formed in the support layer.

To further facilitate the laying of a floor covering using floor elements in accordance with the present invention, the coupling elements on the first pair of opposition sides are formed such that adjacent floor elements can be joined together by an angling movement. In this manner, the weight of the floor element which is being angled or folded down into the groove of an already laid floor element can assist in making up the joint between the two panels.

In one embodiment, the groove on the second edge of the floor element has an upper lip and a lower lip with the lower lip extending beyond the upper lip in the horizontal direction by a first distance. By providing the second locking surface in a region of the lower lip which extends beyond the upper lip, laying of a floor covering can be further facilitated in that the tongue of the panel which is to be inserted into the groove can be guided into the groove by resting the tongue on the longer lower lip during angling down of the floor element at the same time that a secure locking in the horizontal direction is attained.

In a further embodiment, along the second remaining length or lengths on the second side of the floor element, the lower lip extends beyond the upper lip in the horizontal direction by a second distance, the second distance may be less than the first distance. This may be attained by removing a distal portion of the lower lip in which the second locking surface is provided.

In an embodiment, the first locking surface is formed on a local protrusion on a side of the tongue facing the lower lip, the local protrusion forming a deepest portion of the tongue, the deepest portion being at a first depth distance in a vertical direction from the upper surface. Additionally, over the first remaining length or lengths the tongue has a deepest portion, the deepest portion being at a second depth distance in a vertical direction from the upper surface, the second depth distance being less than the first depth distance. This may be attained by removing at least part of the local protrusion from the tongue along the first remaining length or lengths.

In order to reduce the amount of friction between two joined panels, the first remaining length or lengths may be between 10% and 80% of the length of the first edge, preferably between 25% and 60% of the length of the first edge. Similarly, the second remaining length or lengths may be between 10% and 80% of the length of the second edge, preferably between 25% and 60% of the length of the second edge.

In a further embodiment, the first remaining length or lengths is located between portions of the first edge length having the first locking surface. Similarly, the second remaining length or lengths may be located between portions of the second edge length having said second locking surface. In this respect, it is to be understood that the location of the first remaining length or lengths on the first edge does not have to correspond to the location of any second remaining length or lengths on the second edge.

To provide locking in all directions, the support layer may be provided with coupling means on the second pair of opposite sides as well as on the first pair of opposite sides. In one embodiment, the coupling means on the second pair of opposite sides are in the form of a tongue and a groove having corresponding features to the coupling means on the first pair of opposite sides.

Although it is contemplated that the support layer of the floor element according to the invention may be made of any suitable material, in a preferred embodiment the support layer is made of a polymeric, preferably thermoplastic, material, preferably rigid PVC. Advantageously, the support layer comprises between 50 and 75 wt. % of filler, preferably mineral particles.

Although according to the preferred embodiment the support layer comprises of polymeric material, it is not excluded that according to alternative embodiments the support layer may comprise other materials. In fact, with the aim of the present invention the substrate may comprise any material suitable to be used as support layer in furniture, wall covering or floor panel. It is also preferable that the substrate is waterproof. For example, the substrate can comprise a cement-based material, or a mineral based material.

In case of cement-based material the substrate may comprise a fiber containing cement board, for example portland cement board. With fiber containing cement support layer is intended a support layer containing at least a cement and a fibrous material, bonded together, for example pressed together to form the board. The fibers can be for example polymeric fibers or natural fibers. The adhesion is preferably carried out under pressure either in a cold or warm condition.

In case of mineral-based material the substrate may comprise a fiber containing mineral board. With fiber containing mineral support layer is intended a support layer containing at least a mineral and a fibrous material, bonded together, for example pressed together to form the board. The mineral can comprise silica, calcium carbonate, gypsum and/or magnesium oxide. The fibers can be for example polymeric fibers or natural fibers, for example cellulose or wood fibers. The mineral-based material the substrate may comprise glass fibers, preferably non-woven fiberglass. The adhesion is preferably carried out under pressure either in either in a cold or warm condition.

In case of mineral-based material the substrate may comprises a multilayer structure. For example, the substrate can comprise a plurality of sheets or layers of mineral-based material bonded together to form the substrate. Said sheets can have the same composition or, preferably, said sheets can have different compositions. For example, the substrate can comprise an upper sheet, a lower sheet and at least an intermediate sheet, wherein said upper sheet and said lower sheet can have substantially the same composition that is different from the composition of the intermediate sheet. For example, the upper and lower sheets can comprise fiberglass, and/or a higher amount of fiber, preferably natural fiber, with respect to the intermediate sheet. This solution provides for an engineered substrate having the desired mechanical and physical properties, in particular in term of thermal stability and rigidity, and a low cost thank to an intermediate sheet having a cheaper composition. It is to be noted that the multilayer structure can comprise a plurality of sheets having different physical and/or mechanical characteristics. For example, said sheets can have different density and/or porosity. In a preferred example, the substrate can comprise a lower and/or a top sheet with lower porosity and an intermediate sheet with higher porosity to provide waterproofness while the intermediate layer help in keeping a lower overall density of the substrate and reducing the cost of the substrate itself.

In case of mineral-based material, examples of magnesium oxide-based boards are inter alia magnesium oxychloride-based support layer (Sorel cement), magnesium oxysulfate-based support layer and magnesium sulfate-based.

In case of mineral-based material the substrate may show density for example between 0.85 g/cm$^3$ and 2 g/cm$^3$, for example between 0.85 g/cm$^3$ and 1.5 g/cm$^3$.

It is to be noted that cement-based material and mineral-based material provides the advantage of a low flammability. Moreover, said cement-based material and mineral-based material are rigid and show a limited thermal expansion. Said thermal expansion is in fact very similar to that of stone like material, therefore the floor covering result in a highly stable floor covering. It is also to be noted that the high rigidity of the cement-based material or mineral-based material provides an important contributes in the overall impact strength of the floor covering.

Although it is contemplated that the decorative layer of the floor element according to the invention may comprise any suitable material for the visual surface of a floor element, the present invention is particularly applicable for floor elements in which the decorative layer is made of a ceramic material. More generally, the invention is related to a floor element with decorative layer made of a brittle material such as natural stone, glass or sintered ceramic materials like porcelain, earthenware or the like.

It is to be noted that according to deviant embodiments of the inventions the decorative layer can be in the form of a print provided directly on the support or in the form of a printed foil, for example of a paper or a thermoplastic foil. In this case the decorative layer can be part of a top layer comprising also a transparent or translucent wear layer above the decorative layer, for example a thermoplastic wear layer or a thermosetting wear layer. This can be the case especially when the support layer is made of a relatively heavy material like mineral-based board or cement-based board. In fact, in this case the support itself can be so heavy so that measures according to the independent aspect of the inventions are necessary to improve sliding.

In one embodiment, on at least the first pair of opposite sides, the tongue is provided with a third locking surface and the groove is provided with a fourth locking surface. These locking surfaces serve to limit, preferably prevent, vertical movement between two joined floor elements. To achieve this, the third locking surface is provided on an upward facing surface of the tongue and the fourth locking surface is provided on a downward facing surface of the groove. Preferably, at least one, preferably both, of the third and fourth locking surfaces extends along substantially the entire respective edge length.

In accordance with a second independent aspect, the invention pertains to a floor element for forming a floor covering, the floor element comprising an upper surface, a lower surface opposite the upper surface, a first edge and a second edge forming a first pair of opposite sides, a third edge and a fourth edge forming a second pair of opposite sides. The support layer is provided with coupling elements on the first pair of opposite sides. The coupling elements on the first pair of opposite sides are in the form of a tongue extending along a length of the first edge and a groove extending along a length of the second edge. The tongue is provided with a first locking surface and the groove is provided with a second locking surface. The first and second surfaces are intended to prevent two joined elements from drifting apart in a horizontal direction perpendicular to the joined edge. The first locking surface extends along only a portion or portions of the first edge length to thereby provide a first remaining length or lengths devoid of the first locking surface. Separately or in combination, the second locking surface extends along only a portion or portions of the second edge length to thereby provide a second remaining length or lengths devoid of the second locking surface. The support layer is provided with coupling elements on the second pair of opposite sides, these coupling elements being devoid of locking surfaces which prevent two joined elements from drifting apart in a horizontal direction perpendicular to the joined edge.

The floor element in accordance with said second independent aspect can comprise one or more of the features described in relation to the first independent aspect.

In accordance with a third independent aspect, the invention pertains to a floor element for forming a floor covering, the floor element comprising an upper surface, a lower surface opposite the upper surface, a first edge and a second edge forming a first pair of opposite sides, a third edge and a fourth edge forming a second pair of opposite sides. The support layer is provided with coupling elements on at least the first pair of opposite sides. The coupling elements on the first pair of opposite sides are in the form of a tongue extending along a length of the first edge and a groove extending along a length of the second edge. The groove has an upper lip and a lower lip and the tongue has an insertion length substantially corresponding to the length of the tongue beneath the upper lip of the groove when two panels are joined. In this context substantially corresponding means that the insertion length can differ from the length of the tongue for a maximum of 20% of the length of the tongue itself. The tongue is provided with a first locking surface and the groove is provided with a second locking surface, the first and second surfaces being intended to prevent two joined elements from drifting apart in a horizontal direction perpendicular to the joined edge. The insertion length of the tongue varies along the first edge length between a maximum insertion length and a minimum insertion length. Preferably, the insertion length of the tongue is either the maximum insertion length or the minimum insertion length.

The floor element in accordance with said third independent aspect can comprise one or more of the features described in relation to the first independent aspect.

BRIEF DESCRIPTION OF THE DRAWINGS

With the intention of better showing the characteristics of the invention, in the following, as an example without any limitative character, several preferred forms of embodiments are described with reference to the accompanying drawings, wherein.

DETAILED DESCRIPTION OF THE INVENTION

Figure 1:
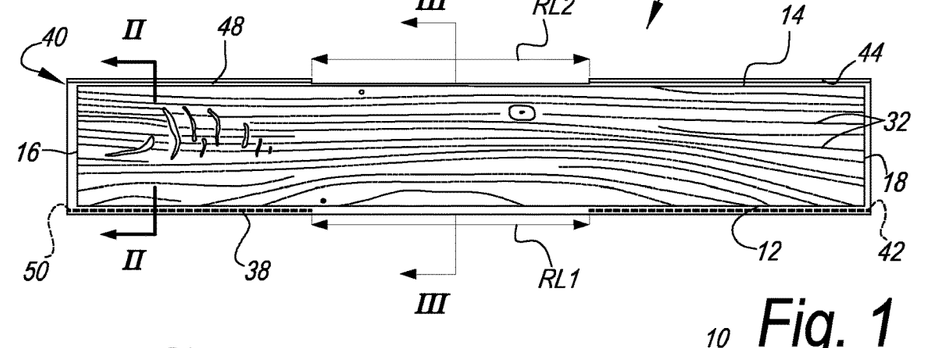
FIG. 1 shows a schematic plan view of an embodiment of a floor element of the invention.

In the drawings, reference number 10 denotes a floor element 10 according to the invention. As illustrated in FIG. 1, the floor element 10 may have a rectangular elongated shape. Alternatively, the floor element may be square. Generally, the floor element 10 may have a major surface area of less than 1.5 m$^2$, preferably less than 1.0 m$^2$, more preferably less than 0.4 m$^2$. Irrespective of its major surface area, the floor element 10 has a first edge 12 and a second edge 14 forming a first pair of opposite sides and a third edge 16 and a fourth edge 18 forming a second pair of opposite sides. The edges may have a maximum length of less than 1.5 m, preferably less than 0.9 m.

It is to be noted that in order to highlight certain features of the invention certain dimensions and proportion in the drawing may be altered, in particular in FIG. 1.

Figure 2:
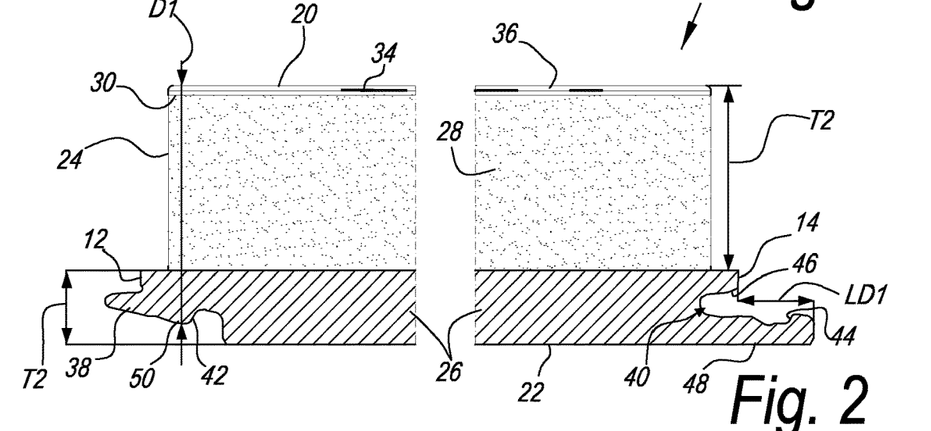
FIG. 2 on a larger scale shows a cross-section along the line II-II of FIG. 1.

As is perhaps most clearly derivable from FIG. 2, the floor element 10 has an upper surface 20 and a lower surface 22 opposite the upper surface. The upper surface 20 is constituted by a decorative layer 24. In the illustrated embodiment, the lower surface 22 is provided on a support layer 26.

According to the illustrated example the decorative layer 24 comprises a body 28 made of a ceramic material, for example red body ceramic, porcelain, stoneware, earthenware, or other sintered ceramic powders. In one embodiment, the decorative layer is a ceramic tile or slab. The expression "ceramic tile" relates to an element with a substantially flat body consisting of baked minerals, such as clay, and preferably with a fired decorative top surface, preferably but not necessarily, on the basis of a glaze. In the illustrated embodiment, the decorative layer 24 may further comprise a background coating 30 covering at least partially an upper surface of the body 28, for example comprising at least a glaze. The background coating 30 is adapted to receive a décor 32 on its top. The background coating 30 can be white, beige, brown or of any color suitable to receive the décor 32 on its top.

The décor 32 can be provided with a variety of textures, designs and colors. In the illustrated example (see FIG. 1) the décor simulates a wood pattern comprising wood nerves and flakes. Preferably, the décor 32 is at least partially formed by a print 34. The print 34 is preferably realized by means of digital printing, such as inkjet printing, although screen printing, rotogravure, flexography or off-set printing is not excluded.

The decorative layer 24 may further comprise a protective coating 36 covering at least partially the upper surface of the body 28, for example comprising at least a glaze. The protective coating 36 is adapted to be placed above the décor 32 and is transparent or translucent.

FIG. 2 also shows that the decorative layer 24 has a thickness T1. The thickness T1 may be comprised between 4 and 15 mm, for example 6 mm, preferably above 7 mm, for example 8 or 10 mm.

It is noted that the decorative layer 24 may have a density expressed as surface weight of at least 2 kg/sqm, preferably at least 5 kg/sqm, for example above 10 kg/sqm. High density of the decorative layer may improve installation of the floor covering and, in particular, a vertical locking between the floor elements as it will be described below in more detail. It is also preferred that the decorative layer comprises a density expressed as surface weight of less than 35 kg/sqm, preferably below 30 kg/sqm, for example below 25 kg/sqm. In fact, an excessively heavy decorative layer may affect the maneuverability of the floor element 10 as well as complicating the packaging and the transportation thereof.

The support layer 26, according to one example, is made of a polymeric material, preferably a thermoplastic material, preferably with a glass transition temperature (Tg) below 100° C., for example of PVC (polyvinyl chloride) or polyurethane, more particularly thermoplastic polyurethane. Examples of thermoplastic material are PVC, polyethylene, polypropylene and polyethylene terephthalate. Forming the support layer out of a material with a relatively low glass transition temperature leads to a support layer which is easily compressed at room temperature. Compression is desirable in many respects. For example, a possible thermal expansion of the support layer may be partially or wholly suppressed by the more rigid or stiffer decorative layer and/or reinforcing element that holds the material of the support layer in its original dimension. Compression is also interesting for the design of coupling elements and allows for a certain adaptation to unevenness of the subfloor, which in its turn prevents air chambers in between the support layer and the subfloor that may amplify walking noises. Compression is also preferable for floor element having a significant planarity deviation since the coupling elements can more easily adapt to each other in case of differences in heights.

Of thermoplastic materials, PVC is a preferred choice for the support layer due to the balance between processability, physical and mechanical properties and cost.

The support layer 26 can be made either of a flexible or, preferably, of a rigid PVC, wherein rigid PVC comprises an amount of plasticizer lower than 15 phr, and flexible PVC comprises an amount of plasticizer of 15 phr or higher, preferably more than 20 or more than 25 phr. Within the context of the present description, "rigid" means that the support layer, taken alone, bends under the own weight thereof less than 10 cm per meter and still better less than 5 cm per meter, whereas the "flexible" means that the support layer, taken alone, bends under the own weight thereof more than 10 cm per meter. The support layer may also comprise a high amount of filler materials, such as minerals, for example chalk, talc, calcium carbonate, silica, e.g. more than 30 wt. % or more than 60 wt. % of such filler materials. The fillers add weight to the support layer and make the support layer very effective in deadening the transit of walking sound to lower quarters. Anyway, the content of filler should be preferably limited to below 80 wt. %, preferably below 75 wt. % in order not to excessively increase brittleness of the floor element. Rigid PVC provides for a support layer having good dimensional stability when exposed to variations in temperature. In other words, the expansion of the floor element, when exposed to high temperature, is limited thereby providing good stability of the floor covering. A support layer made of flexible PVC has lower dimensional stability but is more easily compressed and therefore its tendency to expand could be suppressed at least to some extent by other components of the floor elements.

According to one embodiment, the support layer 26 is made a material having a flexural modulus above 1.5 GPa, preferably above 3 GPa, more preferably above 5 GPa, for example, approximately 8 GPa. Said flexural modulus is preferably below 15, more preferably below 10 GPa. The support layer may also comprise a flexural strength between 20 and 90 MPa, for example between 30 and 50 MPa. In fact, inventors have found that the rigidity of the support layer helps in absorbing the impact energy, thereby improving the impact strength.

In a preferred embodiment, the support layer 26 is made of rigid thermoplastic material, preferably PVC, having a content of mineral filler, preferably comprising calcium carbonate, between 50% and 75% by weight. According to this preferred embodiment, the support layer is made of a material having a flexural modulus between 5 and 10 GPa, for example approximately 8 GPa. It is to be noted that floor elements made of rigid PVC (also known as SPC "solid polymer composite" or "stone polymer composite") on the market, have a flexural modulus between 1.5 and 3.5 GPa. The inventors have found that by increasing the filler content it is possible to make it stiffer.

According to an embodiment of the invention, the support layer 26 can be designed in such a way to compensate to variations of shape and/or dimension due, for example, to variations of the temperature. For example, the support layer can be formed of a plurality of separated elements, for example strips, or can comprise transversal notches separating adjacent portions of the support layer thereby permitting the expansion of said portions without affecting the global stability of the floor covering.

Preferably, the support layer 26 is made of a material that comprises a thermal expansion coefficient below 85 μm/m per ° C., preferably below 60 μm/m per ° C. for example 50 μm/m per ° C. For example, thermal expansion coefficient of the support layer is comprised between 20 μm/m per ° C. and 85 μm/m per ° C., preferably between 40 μm/m per ° C. 60 μm/m per ° C. This is the case when the support layer is made of a rigid plastic, for example rigid PVC, or when it is made of a fiber cement or mineral material.

Furthermore, the support layer 26 preferably has a thickness T2 comprised between 2 and 7 mm, preferably below 6 mm, more preferably about 4 mm or less (note that the drawings are not to scale). Thus, the thickness of the floor element may be lower than 20 mm, preferably 18 mm or lower, more preferably 13 mm or lower. In this way, the thickness of the resulting floor element is relatively thin, so that the impact of the floor in the environment is reduced, especially in case of restoration of existing flooring. Moreover, in this way, the surface weight of the floor element is limited so that the packaging, transportation and installation are made easier.

In a particular embodiment wherein the decorative layer 24 is made of porcelain and comprises a thickness of 8.5 mm and wherein the support layer 26 is made of PVC and comprises a thickness of 4 mm, the surface weight of the floor element is approximatively 24 kg/sqm. Thank to this, a favorable balance between economy of transport and packaging and easiness of installation is achieved. In fact, a weight above said limits may help the coupling between two floor elements, especially in improving a vertical locking between them.

In accordance with the present invention, the support layer 26 is provided with coupling elements on at least the first pair of opposite sides of the floor element 10. The coupling elements on the first pair of opposite sides are in the form of a tongue 38 extending along a length of the first edge 12 and a groove 40 extending along a length of the second edge 14. With particular reference to FIG. 2, the tongue 38 is provided with a first locking surface 42 and the groove 40 is provided with a second locking surface 44. The first and second surfaces 42, 44 serve to prevent two joined floor elements from drifting apart in a horizontal direction perpendicular to the joined edge. As may be gleaned from FIG. 1, the first locking surface 42 extends along only a portion or portions of the first edge length to thereby provide a first remaining length or lengths RL1 devoid of the first locking surface 42. Alternatively, or in combination, the second locking surface 44 extends along only a portion or portions of the second edge length to thereby provide a second remaining length or lengths RL2 devoid of the second locking surface 44. Although in FIG. 1 the first remaining length RL1 is illustrated as being located directly opposite to, and of the same length as, the second remaining length RL2, it is to be understood that, when a floor element has both first and second remaining lengths, these lengths may be different and may be positioned at different locations along the respective edge lengths.

Again with particular reference to FIG. 2, the groove 40 on the second edge 14 has an upper lip 46 and a lower lip 48, with the lower lip extending beyond the upper lip in the horizontal direction by a first distance LD1. For ease of installation, the second locking surface 44 is provided in a region of the lower lip 48 which extends beyond the upper lip 46. Typically, the first distance LD1 may be between 0.7 and 2.0 times the thickness T2 of the support layer 26, preferably between 0.8 and 1.2 times T2 and most preferably LD1 is substantially equal to T2.

Turning to the first edge 12 of the floor element 10, the first locking surface 42 is formed on a local protrusion 50 on a side of the tongue 38 facing the lower lip 48 when two floor elements are joined together. The local protrusion 50 forms a deepest portion on the tongue. The deepest portion is at a first depth distance D1 when measured in a vertical direction from the upper surface 20 of the floor element.

Figure 3:
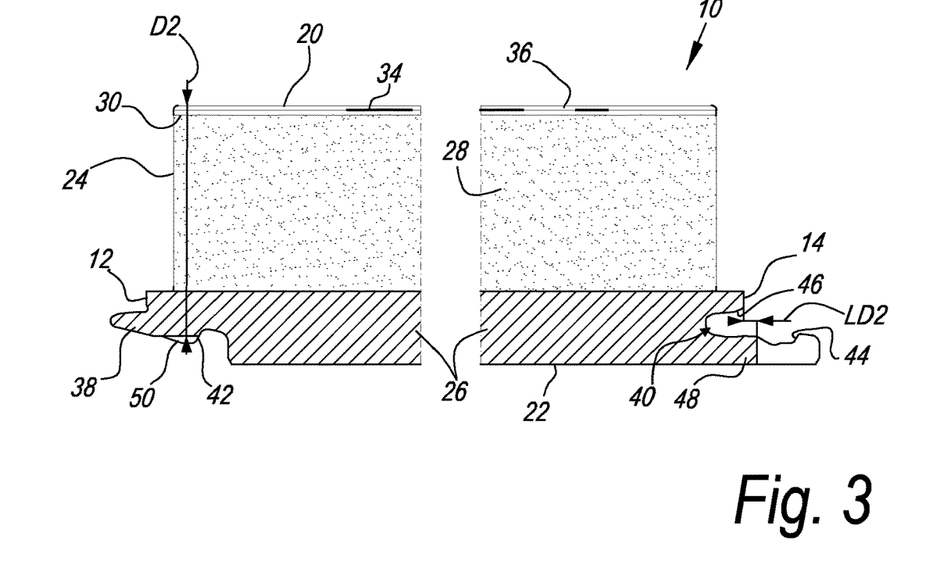
FIG. 3 on a larger scale shows a cross-section along line III-III of FIG. 1.

FIG. 3 is a view similar to FIG. 2, though taken along line III-III of FIG. 1, i.e. through a cross-section of the floor element 10 at a location along the first and second edges 12, 14 at which the first and second remaining lengths RL1 and RL2, respectively, are present. Considering first the groove 40, along the second remaining length RL2 the lower lip 48 extends beyond the upper lip 46 in the horizontal direction by a second distance LD2, the second distance LD2 being less than the first distance LD1. This can suitably be achieved by removing a distal portion 52 of the lower lip 48, as depicted in FIG. 3 by dashed lines, for example by milling. Since the second locking surface 44 is located in the distal portion 52 of the lower lip 48, removal of the distal portion 52 along a length of the second edge 14 will result in the second remaining length RL2 being devoid of the second locking surface 44. By how much the second distance LD2 is less than the first distance LD1 will depend i.a. on the location of the second locking surface 44 on the distal portion 52 of the lower lip, it being necessary only to remove a sufficient amount of the lower lip 48 such that the remaining portion of the lower lip is devoid of the second locking surface 44. Typically, the second distance LD2 may be between 20% and 70% of the first distance LD1, preferably between 30% and 60%.

Turning again to the first edge 12 of the floor element 10, it will be apparent from FIG. 3 that the local protrusion 50, depicted in dashed lines, is absent from the tongue 38. This may, for example, be achieved by milling away the local protrusion. This means that, along the first remaining length RL1 at the first edge 12, the tongue has a deepest portion at a second depth distance D2 when measured in a vertical direction from the upper surface 20 of the floor element, the second depth distance D2 being less than the first depth distance D1. Since the first locking surface 42 is located on the local protrusion 50 of the tongue 38, removal of the local protrusion 50 along a length of the first edge 12 will result in the first remaining length RL1 being devoid of the first locking surface 42.

The proportion of the length of the first edge 12 which is constituted by the first remaining length RL1 and the proportion of the length of the second edge 14 which is constituted by the second remaining length RL2 will depend on by how much it is desired to reduce friction in a joint between two adjacent panels along those edges. Typically, the first remaining length RL1 (or lengths if there is a plurality of lengths devoid of the first locking surface 42) is between 10% and 80% of the length of the first edge, preferably between 25% and 60% of the length of the first edge. Similarly, the second remaining length RL2 (or lengths if there is a plurality of lengths devoid of the second locking surface 44) is between 10% and 80% of the length of the second edge, preferably between 25% and 60% of the length of the second edge. It is to be understood, of course, that a reduction in friction in a joint constituted by the first edge 12 of one floor element coupled to a second edge 14 of an adjacent floor element can be achieved if only one of said edges 12, 14 has a remaining edge length RL1 or RL2 that is devoid of one of the locking surfaces 42, 44.

In one embodiment, the first remaining length or lengths RL1 is located between portions of the first edge 12 having the first locking surface 42, i.e. between those portions of the tongue 38 having the local protrusion 50. Similarly, in either the same or another embodiment, the second remaining length or lengths RL2 is located between portions of the second edge 14 having the second locking surface 44, i.e. between portions of the lower lip 48 of the groove having the distal portion 52 of the lower lip 48.

In some instances, and particularly if the floor elements 10 are relatively light, it may be advantageous to provide the support layer 26 with coupling elements on the second pair of opposite sides 16, 18. For ease of manufacturing, the coupling elements on the second pair of opposite sides may be in the form of tongue and a groove having corresponding features to the coupling elements on the first pair of opposite sides.

Figure 4:
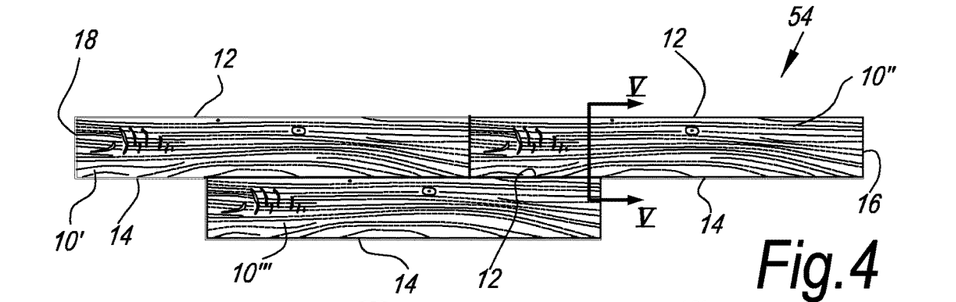
FIG. 4 on a smaller scale shows a plan view of a floor covering comprising a plurality of the floor elements of FIG. 1.

FIG. 4 schematically illustrates a portion of a floor covering 54 made up of three floor elements 10', 10", 10'" according to the present invention. A third edge 16 of a first floor element 10' is joined to a fourth edge 18 of a second floor element 10" to form a first row of floor elements. A third floor element 10'" is joined to the first row of floor elements by means of the first edge 12 of the third panel being joined to the respective second edge of the first and second floor elements 10', 10".

Figure 5:
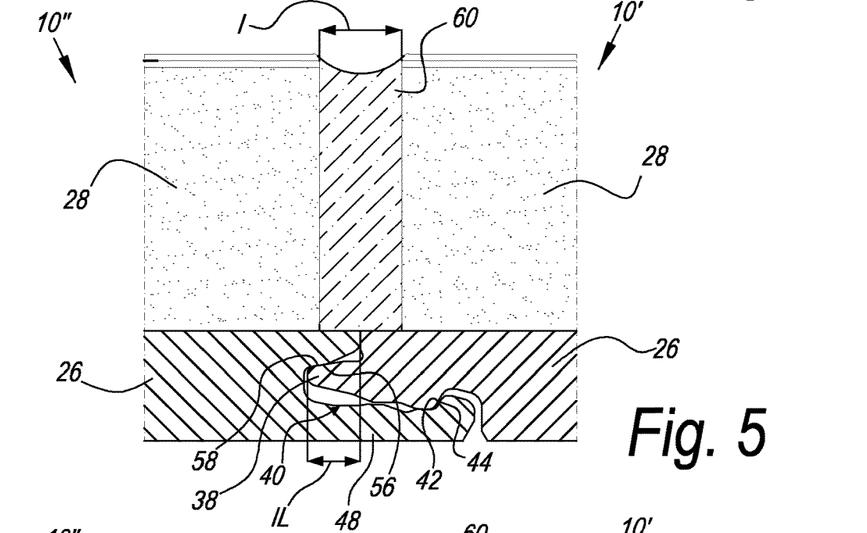
FIG. 5 on a larger scale shows a cross-section along the line V-V of FIG. 4.

FIG. 5 is a cross-sectional view along line V-V in FIG. 4. The tongue 38 of the third floor element 10'" is accommodated in the groove 40 of the second floor element 10" such that the first locking surface 42 on the local protrusion 50 of the tongue engages with the second locking surface 44 on the lower lip 48 of the groove 40 to thereby prevent the two floor elements from drifting apart in the horizontal direction.

In order to limit, and preferably prevent, vertical movement between two joined floor elements, at least on a first pair of opposite sides, the tongue 38 is provided with a third locking surface 56 on an upward facing surface of the tongue and the groove is provided with a fourth locking surface 58 on a downward facing surface of the groove 40. The third and fourth locking surfaces 56, 58 overlap each other by an amount of overlap. Particularly if the floor covering 54 is constituted by floor elements that are relatively light, it may be beneficial for stability reasons that at least one, and preferably both, of the third and fourth locking surfaces 56, 58 extends along essentially the entire respective edge length.

A particular embodiment is illustrated in FIG. 5 in which the floor covering comprises a grout 60 filling an intermediate distance I separating the decorative layers 28 of the floor elements 10", 10'". According to the illustrated example, the intermediate distance I is twice the distance between the upper edge of the support layer 26 and the edge of the decorative layer 28. It is to be noted that the intermediate distance I is not necessarily twice the distance although it depends on said distance. Preferably said intermediate distance I is 2 to 3 mm.

Preferably a polymeric and/or cement-based grout 60 is used. The grout 60 may be a flexible or rigid grout. A flexible grout may be for example a silicone-based grout whereas a rigid grout may be for example an epoxy-based grout or cement-based grout. Epoxy-based, and silicone-based are example of polymeric grout, other examples of polymeric grout are polyurethane-based or acrylic-based grout. In one embodiment, the grout can show a compressive strength above 20 MPa, for example comprised between 24 and 60 MPa. Preferably, the grout can show a hardness Shore A above 70, for example between 80 and 90.

Figure 6:
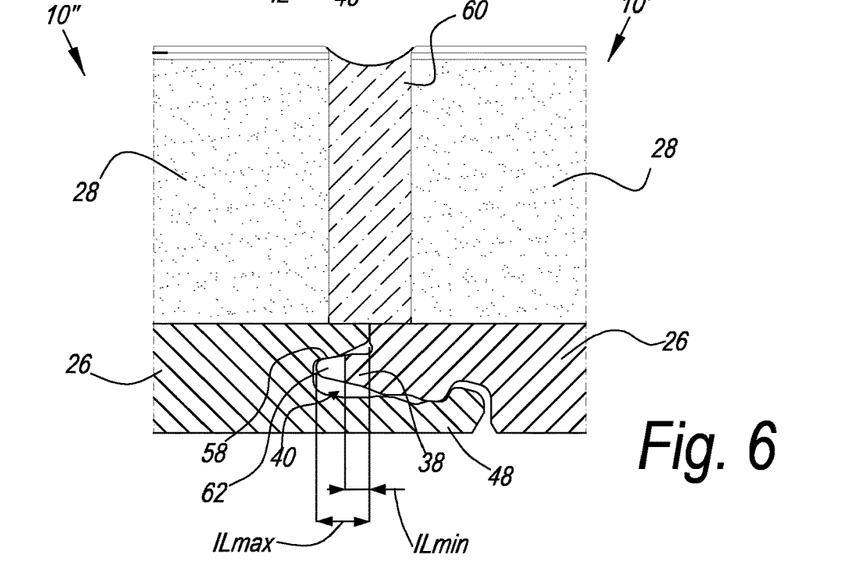
FIG. 6 corresponds to FIG. 5, though with a modified coupling element.

Since the coupling elements of the support layer 26 in the FIG. 5 embodiment are provided with the third and the fourth locking surfaces 56, 58, friction will arise between these surfaces when trying to slide one floor element with respect to another floor element. In accordance with a further independent aspect of the present invention, which may nevertheless be combined with previously described embodiments, the third locking surface 56 on the tongue 38 of the floor element 10'" may be reduced in size or even omitted, as shown in FIG. 6. This is achieved by varying an insertion length IL of the tongue 38 into the groove 40 along the first edge length. Thus, along a first portion of the length of the first edge 12, the tongue has a maximum insertion length ILMAX. Consequently, the amount of overlap between third and fourth locking surfaces 56, 58 is at its greatest. When it is desired to reduce the amount of friction between the joined floor elements, a distal portion 62 of the tongue, as denoted by dashed lines in FIG. 6, may be removed so that the tongue has a minimum insertion length ILMIN. In this manner, the amount of overlap between the third and fourth locking surfaces is reduced. Indeed, and particularly if the floor elements are relatively heavy, the minimum insertion length ILMIN may be such that the amount of overlap becomes zero.

Although it is conceivable that the insertion length IL of the tongue varies continuously or stepwise along the first edge length between the maximum insertion length ILMAX and the minimum insertion length ILMIN, for ease of manufacturing it is advantageous if the insertion length is either the maximum insertion length or the minimum insertion length at any one point along the first edge length.

It will be understood that, if the floor elements are provided with tongue and groove coupling elements at the second pair of opposite sides, the tongue of those coupling elements may also have an insertion length that varies between a maximum insertion length and a minimum insertion length.

It will be further understood that additional means for reducing friction along the joint between two floor elements of the present invention may be utilized in combination with the present invention, for example by the provision of play between surfaces of the coupling elements or providing a friction-reducing agent on one or more surfaces of the coupling elements.

As will be apparent from the above disclosure, the present invention relates to one or more of the items listed below, numbered from 1 to 24:

Item 1. A floor element for forming a floor covering, the floor element comprising: an upper surface; a lower surface opposite the upper surface; a first edge and a second edge forming a first pair of opposite sides; a third edge and a fourth edge forming a second pair of opposite sides; a decorative layer; and a support layer, the support layer being provided with coupling elements on at least said first pair of opposite sides, said coupling elements on said first pair of opposite sides being in the form of a tongue extending along a length of said first edge and a groove extending along a length of said second edge, the tongue being provided with a first locking surface and the groove being provided with a second locking surface, said first and second surfaces being intended to prevent two joined elements from drifting apart in a horizontal direction perpendicular to the joined edge, the first locking surface extending along only a portion or portions of said first edge length to thereby provide a first remaining length or lengths devoid of the first locking surface and/or the second locking surface extending along only a portion or portions of said second edge length to thereby provide a second remaining length or lengths devoid of the second locking surface.

Item 2. The floor element according to item 1, wherein said coupling elements on said first pair of opposition sides are formed such that adjacent floor elements can be joined together by an angling movement.

Item 3. The floor element according to item 1 or 2, wherein the groove on said second edge has an upper lip and a lower lip, the lower lip extending beyond the upper lip in the horizontal direction by a first distance, the second locking surface being provided in a region of the lower lip which extends beyond the upper lip.

Item 4. The floor element according to item 3, wherein, along said second remaining length or lengths, the lower lip extends beyond the upper lip in the horizontal direction by a second distance, the second distance being less than the first distance.

Item 5. The floor element according to any of the preceding items, wherein the first locking surface is formed on a local protrusion on a side of the tongue facing the lower lip, the local protrusion forming a deepest portion of the tongue, the deepest portion being at a first depth distance in a vertical direction from said upper surface.

Item 6. The floor element according to item 5, wherein over said first remaining length or lengths the tongue has a deepest portion, the deepest portion being at a second depth distance in a vertical direction from said upper surface, the second depth distance being less than said first minimum distance.

Item 7. The floor element according to any of the preceding items, wherein the first remaining length or lengths is between 10% and 80% of the length of said first edge, preferably between 25% and 60% of the length of said first edge.

Item 8. The floor element according to any of the preceding items, wherein the second remaining length or lengths is between 10% and 80% of the length of said second edge, preferably between 25% and 60% of the length of said second edge.

Item 9. The floor element according to any of the preceding items, wherein the first remaining length or lengths is located between portions of said first edge length having said first locking surface.

Item 10. The floor element according to item 9, wherein the second remaining length or lengths is located between portions of said second edge length having said second locking surface.

Item 11. The floor element according to any of the preceding items, wherein the support layer is provided with coupling elements on said second pair of opposite sides.

Item 12. The floor element according to item 11, wherein the coupling elements on said second pair of opposite sides are in the form of a tongue and a groove having corresponding features to the coupling elements on the first pair of opposite sides.

Item 13. The floor element according to any of the preceding items, wherein said support layer is made of a thermoplastic material, preferably rigid PVC.

Item 14. The floor element of item 13, wherein said support layer comprises between 50 and 75 wt. % of filler, preferably mineral particles.

Item 15. The floor element according to any of the preceding items, wherein said decorative layer is made of a ceramic material.

Item 16. The floor element according to any of the preceding items, wherein, on at least said first pair of opposite sides, said tongue is provided with a third locking surface and said groove is provided with a fourth locking surface, said third and fourth locking surfaces serving to limit, preferably prevent, vertical movement between two joined floor elements, said third locking surface being provided on an upward facing surface of the tongue and said fourth locking surface being provided on a downward facing surface of said groove.

Item 17. The floor element according to item 16, wherein at least one, preferably both, of said third and fourth locking surfaces extends along substantially the entire respective edge length.

Item 18. The floor element according to any of items 3 to 17, wherein the tongue, at least on said first pair of opposite sides, has an insertion length corresponding to the length of the tongue beneath the upper lip of the groove when two panels are joined, wherein said insertion length of said tongue varies along said first edge length between a maximum insertion length and a minimum insertion length.

Item 19. A floor element for forming a floor covering, the floor element comprising: an upper surface; a lower surface opposite the upper surface; a first edge and a second edge forming a first pair of opposite sides; a third edge and a fourth edge forming a second pair of opposite sides; a decorative layer; and a support layer, the support layer being provided with coupling elements on said first pair of opposite sides, said coupling elements on said first pair of opposite sides being in the form of a tongue extending along a length of said first edge and a groove extending along a length of said second edge, the tongue being provided with a first locking surface and the groove being provided with a second locking surface, said first and second surfaces being intended to prevent two joined elements from drifting apart in a horizontal direction perpendicular to the joined edge, the first locking surface extending along only a portion or portions of said first edge length to thereby provide a first remaining length or lengths devoid of the first locking surface and/or the second locking surface extending along only a portion or portions of said second edge length to thereby provide a second remaining length or lengths devoid of the second locking surface, the support layer being provided with coupling elements on said second pair of opposite sides, said coupling elements on said second pair of opposite sides being devoid of locking surfaces which prevent two joined elements from drifting apart in a horizontal direction perpendicular to the joined edge.

Item 20. The floor element according to item 19, wherein the floor element is elongate such that said first pair of opposite sides is longer than said second pair of opposite sides.

Item 21. A floor element for forming a floor covering, the floor element comprising: an upper surface; a lower surface opposite the upper surface; a first edge and a second edge forming a first pair of opposite sides; a third edge and a fourth edge forming a second pair of opposite sides; a decorative layer; and a support layer, the support layer being provided with coupling elements on at least said first pair of opposite sides, said coupling elements on said first pair of opposite sides being in the form of a tongue extending along a length of said first edge and a groove extending along a length of said second edge, the groove having an upper lip and a lower lip and the tongue having an insertion length corresponding to the length of the tongue beneath the upper lip of the groove when two panels are joined, the tongue being provided with a first locking surface and the groove being provided with a second locking surface, said first and second surfaces being intended to prevent two joined elements from drifting apart in a horizontal direction perpendicular to the joined edge, wherein said insertion length of said tongue varies along said first edge length between a maximum insertion length and a minimum insertion length.

Item 22. The floor element according to item 21, wherein, on at least said first pair of opposite sides, said tongue is provided with a third locking surface and said groove is provided with a fourth locking surface, said third and fourth locking surfaces overlapping each other by an amount of overlap to limit, preferably prevent, vertical movement between two joined floor elements, said third locking surface being provided on an upper facing surface of the tongue and said fourth locking surface being provided on a downward facing surface of said upper lip of said groove.

Item 23. The floor element according to item 22, wherein said amount of overlap between said third and fourth locking surfaces is greater where said tongue has said maximum insertion length than where said tongue as said minimum insertion length.

Item 24. The floor element according to any of items 21 to 23, wherein said insertion length of said tongue is either said maximum insertion length or said minimum insertion length.

The invention has been described above with reference to various embodiments above by way of example only. It is to be understood that the invention may be varied in many ways within the scope of the appended claims. For example, although the present invention is eminently suitable for floor elements having a ceramic decorative layer, the ways described above for reducing friction between joined panels may be applied to floor elements having any decorative surface, for example a decorative surface made of a resin laminate. Furthermore, although various of the above-described floor elements have a support layer comprising a thermoplastic material such as PVC, it is to be understood that the ways described above for reducing friction between joined panels may be applied to floor elements having a support layer of any material. For example, the support layer may be of MDF or HDF. It will further be understood that floor elements in accordance with the present invention may include further layers than those described above. For example, the support layer may comprise a plurality of layers of the same or different material. Depending on the selected materials for the support layer and the decorative layer, it may be beneficial to provide a balancing layer on the lower surface of the floor element.

The invention claimed is:

1. A floor element for forming a floor covering, the floor element comprising:
   an upper surface;
   a lower surface opposite the upper surface;
   a first edge and a second edge forming a first pair of opposite sides;
   a third edge and a fourth edge forming a second pair of opposite sides;
   a decorative layer and
   a support layer,
   the support layer being provided with coupling elements on at least said first pair of opposite sides, said coupling elements on said first pair of opposite sides comprising a tongue extending along a length of said first edge and a groove extending along a length of said second edge, wherein said support layer is made of a thermoplastic material and comprises between 50 and 75 wt. % of filler,
   the tongue being provided with a first locking surface and the groove being provided with a second locking surface, said first and second surfaces being intended to prevent two joined elements from drifting apart in a horizontal direction perpendicular to the joined edge, the first locking surface extending along only a portion or portions of said first edge length to thereby provide a first remaining length or lengths devoid of the first locking surface and/or the second locking surface extending along only a portion or portions of said second edge length to thereby provide a second remaining length or lengths devoid of the second locking surface, wherein the first locking surface is formed on a local protrusion on a side of the tongue facing the lower lip, the local protrusion forming a deepest portion of the tongue, the deepest portion being at a first depth distance in a vertical direction from said upper surface.

2. The floor element according to claim 1, wherein said coupling elements on said first pair of opposite sides are formed such that adjacent floor elements can be joined together by an angling movement.

3. The floor element according to claim 1, wherein the groove on said second edge has an upper lip and a lower lip, the lower lip extending beyond the upper lip in the horizontal direction by a first distance, the second locking surface being provided in a region of the lower lip, wherein the region of the lower lip extends beyond the upper lip.

4. The floor element according to claim 3, wherein, along said second remaining length or lengths, the lower lip extends beyond the upper lip in the horizontal direction by a second distance, the second distance being less than the first distance.

5. The floor element according to claim 4, wherein over said first remaining length or lengths the tongue has a deepest portion, the deepest portion being at a second depth distance in a vertical direction from said upper surface, the second depth distance being less than said first depth distance.

6. The floor element according to claim 1, wherein the first remaining length or lengths is between 10% and 80% of the length of said first edge.

7. The floor element according to claim 1, wherein the second remaining length or lengths is between 10% and 80% of the length of said second edge.

8. The floor element according to claim 1, wherein the first remaining length or lengths is located between portions of said first edge length having said first locking surface.

9. The floor element according to claim 8, wherein the second remaining length or lengths is located between portions of said second edge length having said second locking surface.

10. The floor element according to claim 1, wherein the support layer is provided with coupling elements on said second pair of opposite sides.

11. The floor element according to claim 10, wherein the coupling elements on said second pair of opposite sides comprise a tongue and a groove having corresponding features to the coupling elements on the first pair of opposite sides.

12. The floor element according to claim 1, wherein said decorative layer is made of a ceramic material.

13. The floor element according to claim 1, wherein, on at least said first pair of opposite sides, said tongue is provided with a third locking surface and said groove is provided with a fourth locking surface, said third and fourth locking surfaces serving to limit vertical movement between two joined floor elements, said third locking surface being provided on an upward facing surface of the tongue and said fourth locking surface being provided on a downward facing surface of said groove.

14. The floor element according to claim 13, wherein at least one, preferably both, of said third and fourth locking surfaces extends along substantially the entire respective edge length.

15. A floor element for forming a floor covering, the floor element comprising:
an upper surface;
a lower surface opposite the upper surface;
a first edge and a second edge forming a first pair of opposite sides;
a third edge and a fourth edge forming a second pair of opposite sides;
a decorative layer and
a support layer,
the support layer being provided with coupling elements on said first pair of opposite sides, said coupling elements on said first pair of opposite sides comprising a tongue extending along a length of said first edge and a groove extending along a length of said second edge, the tongue being provided with a first locking surface and the groove being provided with a second locking surface, said first and second surfaces being intended to prevent two joined elements from drifting apart in a horizontal direction perpendicular to the joined edge, the first locking surface extending along only a portion or portions of said first edge length to thereby provide a first remaining length or lengths devoid of the first locking surface and/or the second locking surface extending along only a portion or portions of said second edge length to thereby provide a second remaining length or lengths devoid of the second locking surface, the support layer being provided with coupling elements on said second pair of opposite sides, said coupling elements on said second pair of opposite sides being devoid of locking surfaces that would be configured to prevent two joined elements from drifting apart in a horizontal direction perpendicular to the joined edge, wherein said support layer is made of a thermoplastic material and comprises between 50 and 75 wt. % of filler, wherein the first locking surface is formed on a local protrusion on a side of the tongue facing the lower lip, the local protrusion forming a deepest portion of the tongue, the deepest portion being at a first depth distance in a vertical direction from said upper surface.

16. A floor element for forming a floor covering, the floor element comprising:
an upper surface;
a lower surface opposite the upper surface;
a first edge and a second edge forming a first pair of opposite sides;
a third edge and a fourth edge forming a second pair of opposite sides;
a decorative layer and
a support layer,
the support layer being provided with coupling elements on at least said first pair of opposite sides, said coupling elements on said first pair of opposite sides comprising a tongue extending along a length of said first edge and a groove extending along a length of said second edge, the groove having an upper lip and a lower lip and the tongue having an insertion length corresponding to the length of the tongue beneath the upper lip of the groove, the tongue being provided with a first locking surface and the groove being provided with a second locking surface, said first and second surfaces being intended to prevent two joined elements from drifting apart in a horizontal direction perpendicular to the joined edge, wherein said insertion length of said tongue varies along said first edge length between a maximum insertion length and a minimum insertion length, wherein said support layer is made of a thermoplastic material and comprises between 50 and 75 wt. % of filler.

17. The floor element according to claim 16, wherein said insertion length of said tongue is either said maximum insertion length or said minimum insertion length.

* * * * *